United States Patent [19]  [11] Patent Number: 4,929,309
Bachem et al.  [45] Date of Patent: May 29, 1990

[54] NITROGEN-CONTAINING WATER-SOLUBLE POLYMERIC COMPOUNDS

[75] Inventors: Henning Bachem, Cologne; Carlhans Süling, Odenthal; Janos Muszik, Leverkusen; Wolf-Dieter Schröer, Munich, all of Fed. Rep. of Germany

[73] Assignee: Bayer Aktiengesellschaft, Leverkusen, Fed. Rep. of Germany

[21] Appl. No.: 324,365

[22] Filed: Mar. 15, 1989

[30] Foreign Application Priority Data

Mar. 26, 1988 [DE] Fed. Rep. of Germany ....... 3810425

[51] Int. Cl.$^5$ .............................................. C08G 73/00
[52] U.S. Cl. ................................ 162/164.3; 162/164.6; 528/367; 528/391; 528/405; 528/341; 558/48
[58] Field of Search ............... 528/367, 391, 405, 341; 558/48; 162/164.3, 164.6

[56] References Cited

U.S. PATENT DOCUMENTS

| 3,493,502 | 2/1970 | Coscia | 528/405 X |
| 3,567,659 | 3/1971 | Nagy | 528/405 |
| 4,624,975 | 11/1986 | Pham | 528/405 X |
| 4,718,918 | 1/1988 | Heller et al. | 528/405 X |
| 4,837,283 | 6/1989 | Ries | 528/391 X |
| 4,857,586 | 8/1989 | Bachem et al. | 528/405 X |

FOREIGN PATENT DOCUMENTS 0250131 12/1987 European Pat. Off. .
2938588 4/1981 Fed. Rep. of Germany .
1418302 12/1975 United Kingdom .

Primary Examiner—Earl Nielsen
Attorney, Agent, or Firm—Sprung Horn Kramer & Woods

[57] ABSTRACT

Water-soluble crosslinkable polymeric compounds which are obtainable by reaction of reaction products, containing halogenohydrin groups, of ammonia or mono- or polyamines and an epihalogenohydrin with inorganic bases and subsequent reaction of the resulting compounds containing epoxide groups with halogen-free sulphonic acids to give compounds containing sulphonic acid ester groups are used for imparting wet strength to paper.

10 Claims, No Drawings

NITROGEN-CONTAINING WATER-SOLUBLE POLYMERIC COMPOUNDS

The invention relates to water-soluble crosslinkable polymeric compounds which are obtainable by reaction of reaction products, containing halogenohydrin groups, of ammonia or mono- or polyamines and an epihalogenohydrin with inorganic bases and subsequent reaction of the resulting compounds containing epoxide groups with halogen-free sulphonic acids to give compounds containing sulphonic acid ester groups, their preparation and their use for imparting wet strength to paper.

Reaction products, containing halogenohydrin groups, of ammonia or mono- or polyamines with epichlorohydrin and their use for imparting wet strength to paper are known.

Thus, for example, self-crosslinking water-soluble reaction products of epihalogenohydrins and basic polyamidoamines or polyamines or mixtures thereof, an excess of epihalogenohydrin per equivalent of basic amino groups being used in each case, are described in U.S. Pat. Nos. 3,733,290, 3,778,339, 3,813,362, 4,336,835, 4,287,110, 3,311,594, 3,640,840, 4,487,884, 4,515,657, 4,708,772, 2,926,154, 3,332,901.

Water-soluble condensation products of ε-caprolactam, polyamines, polyamidoamines and epichlorohydrin are known from U.S. Pat. No. 3,645,954.

By the process of U.S. Pat. No. 3,655,506 soluble curable resins are obtained by reaction of epichlorohydrin with ammonia and/or polyamines.

Water-soluble cationic vinyl polymers which are accessible by transamidation of polyacrylamide with polyamines and subsequent reaction with epichlorohydrin are also known from U.S. Pat. No. 3,507,847.

Water-soluble reaction products of polyethyleneimine and epichlorohydrin or dichlorohydrin are known from U.S. Pat. No. 3,520,774.

Crosslinkable amine-epihalogenohydrin resins which have hitherto been used in practice and are described in the literature cited are in general prepared by reaction of 1.0 to 2.5 mol of epihalogenohydrin, based on the basic nitrogen in the amine. The products have a high content of halogenohydrin reactive groups. These ensure that sufficiently reactive crosslinkable products are obtained and the desired wet strength values of paper are thereby achieved.

When used as an agent for imparting wet strength in papermaking, however, an incomplete reaction with the cellulose fibre results and unreacted portions of the products enter the effluent of the papermaking machines and contribute towards pollution thereof with organically bonded halogen.

The invention was thus based on the object of providing storable cationic compounds which can be crosslinked in a neutral to alkaline medium, are comparable in their wet strength effect to the usual epihalogenohydrin resins and contain considerably less organically bonded absorbable halogen.

It has been found that storage-stable products which contain considerably less organically bonded halogen and result in an outstanding improvement in the wet strength of paper treated with them are obtained by reaction of compounds containing halogenohydrin groups with inorganic bases and subsequent reaction of the resulting compounds containing epoxide groups with halogen-free sulphonic acids.

The polymers according to the invention contain sulphonic acid ester groups which are introduced as substituents into the macromolecule by reaction with epoxide groups with sulphonic acids.

Compounds containing halogenohydrin groups are to be understood as products which are obtained by reaction of ammonia or the amines mentioned with epichlorohydrin in a molar ratio of 0.8 to 3.75 mol of epihalogenohydrin per mol of basic nitrogen.

The mono- and polyamines contain at least 1 primary or secondary amino group. The polyamines contain $\geq 2$ basic amino groups. They can also contain tertiary amino, carboxamide or hydroxyl groups.

Preferred water-soluble polymers according to the invention are obtainable by reaction of (A) a water-soluble aliphatic polyamine with primary and/or secondary and if appropriate tertiary amino, carboxamide or hydroxylgroups or mixtures thereof with (B) an epihalogenohydrinand if appropiate subsequent or simultaneous reaction with further polymine A in a molar ratio of 0.8 to 3.75 mol of epihalogenohydrin per mol of basic nitrogen in component A and (C) reaction with an inorganic base in amolar ratio of 0.2 to 2.0 mol of base per mol of halogenhydrin group and (D) reaction with 0.3 to 10 mol of a sulphonic acid, per mol of basic nitrogen in component A, the sulphonic acid being added in at least an amount to achieve a pH of less than 5.

Particularly preferred polymers are obtainable

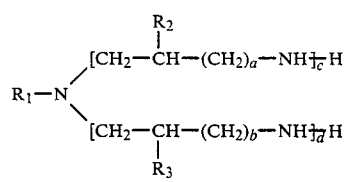

by reaction of (A.1) a water-soluble aliphatic polyamine of the formulae or

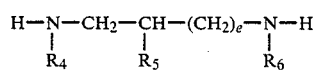

in which $R_1$, $R_4$ and $R_6$ independently of one another stand for hydrogen or a $C_{b\ 1-C4}$-alkyl radical, $R_2$, $R_3$ and $R_5$ independently of one another stand for hydrogen, methyl or ethyl, a, b and e independently of one another stand for an integer from 0 to 4 and c and d independently of one another stand for an integer from 1 to 6, and/or (2) a water-soluble polyamidoamine having a molecular weight of at least 800 and prepared from (α) an amine of the formula (I) or a mixture of (I) with up to 50 mol % of an amine of the formula (II) and (β) aliphatic or aromatic dicarboxylic acids having 2 to 12 C atoms or functional derivatives thereof, such as anhydrides, esters or half-esters, and/or (γ) aminocarboxylic acids containing 3 to 6 C atoms, or lactams thereof, with B. an epihalogenohydrin, and if appropriate simultaneous or subsequent reaction with another polyamine of the formulae (I) or (II), in a molar ratio of 0.8 to 3.75 mol, preferably 0.9 to 3.0 mol, of component B per mol of basic nitrogen of component A,
and C. reaction with an inorganic base in a molar ratio of 0.2 to 2.0 mol, preferably 0.3 to 1.5 mol, of base per mol of halogenohydrin group,
and D. reaction with 0.3 to 10 mol of a sulphonic acid per mol of basic nitrogen of component A, the sulphonic acid being added in at least an amount to achieve acid pH values of less than 5, preferably of 1.5 to 4.5.

The preferred molar ratio of the amines $(2)(\alpha)$ to dicarboxylic acids $(2)(\beta)$ is 0.8 to 1.4:1.

If water-soluble polyamines of the general formula (I) are used as starting compounds, the polymers according to the invention of the general formula

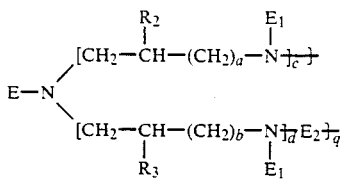   III wherein $R_2$, $R_3$, a, b, c and d have the meaning given in the case of formula (I), q denotes a number from 5 to 250, E and $E_1$ denote hydrogen or a group

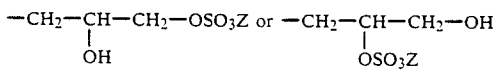

E also denotes $C_1$-$C_4$-alkyl, $E_2$ denotes a group

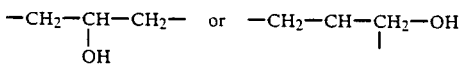

and

Z denotes alkyl, cycloalkyl, aryl or aralkyl, are obtained as reaction products.

The radicals mentioned for Z can in turn be substituted.

Z in particular stands for $C_1$-$C_9$-alkyl, $C_2$-$C_9$-hydroxyalkyl, cyclohexyl. phenyl Or benzyl which are optionally substituted by $C_1$-$C_4$-alkyl, $C_1$-$C_5$-alkoxy, hydroxyl or a sulphonic acid group.

If water-soluble polyamidoamines which are described under (A.2) and are prepared from the amines (I) and aliphatic dicarboxylic acids as starting compounds are used, the polymers of the general formula

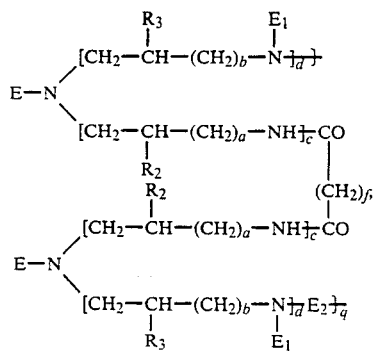   IV according to the invention, wherein f stands for 0 to 10 and the other symbols have the abovementioned meaning, are obtained.

The polyamidoamines contain amino or carboxyl end groups, depending on the molar ratio of $(2\alpha)$ to $(2\beta)$.

If diamines II are additionally used as starting components, the polymers contain amide structures corresponding to the diamines II.

The polymers according to the invention preferably have a molecular weight of 2,000 to 100,000.

At a solids content of 5 to 30% by weight, preferably 10 to 25% by weight, the aqueous or aqueous-organic solutions of the products have a viscosity of 15 to 300 mPas, preferably 20 to 250 mPas, at 25° C.

The polymers according to the invention are preferably prepared in an aqueous medium. It is also possible for other polar solvents, such as ethylene glycol, diethylene glycol, triethylene glycol or polyethylene glycol, glycerol, isopropanol, methanol, ethanol, tert.butanol, dimethylformamide or mixtures thereof with water to be used.

The reaction of the starting components A and B is carried out in a known manner. Aqueous, aqueous-organic or organic 10 to 40% strength solutions of the two components are stirred at a temperature of 25° to 95° C., preferably 35° to 90° C., for this reaction.

The mixture is then already brought to pH values of 8 to 14, preferably 8.5 to 12, during the polycondensation at temperatures of 25° to 95° C., preferably 20° to 70° C., and a minimum viscosity of 10 mPas with the aid of an inorganic base. Inorganic bases which may be mentioned are: LiOH, Ca(OH)$_2$, Ba(OH)$_{24}$, NH$_3$, Na$_2$CO$_3$, K$_2$CO$_3$, Na$_3$PO$_4$, K$_3$PO$_4$, Sr(OH)$_2$ and in particular KOH and NaOH or mixtures thereof.

Cyclization of the halogenohydrin groups present in the polycondensate to give epoxide groups and simultaneous salt formation can take place here with consumption of base.

The reaction mixture is then stirred at 10° to 80° C., preferably 15° to 70° C., for 10 minutes to 10 hours, preferably 15 minutes to 8 hours, if appropriate with the addition of a solvent and while retaining basic pH values of 8 to 14, preferably 8.5 to 12.

In accordance with the process according to the invention, sulphonic acid is then added at this reaction temperature in an amount such that the pH of the solution is pH$\leq$5, preferably 1.0 to 4.5.

Preferred sulphonic acids have the formula $Z-SO_3H$   V wherein

Z has the abovementioned meaning.

Examples which may be mentioned are: hydroxymethanesulphonic acid, hydroxyethanesulphonic acid, cyclohexanesulphonic acid and in particular methanesulphonic acid and alkanesulphonic acid mixtures, the alkane radicals of which contain 1 to 6 C atoms, benzylsulphonic acid, the isomeric dimethylbenzenesulphonic acids, o-xylylenedisulphonic acids, benzene-1,3-disulphonic acid, 4-hydroxybenzenesulphonic acid, 4-$C_1$–$C_4$-alkoxysulphonic acids, 4-hydroxy-1,3-benzenedisulphonic acid and preferably benzenesulphonic acid and toluenesulphonic acid (o, m, p).

The solids content of the finished products is then brought to the technologically desired content by dilution with water or solvents.

Polyamines (I) which may be mentioned are: diethylenetetramine, triethylenetetramine, tetraethylenepentamine, pentaethylenehexamine, hexaethyleneheptamine, heptaethyleneoctamine, dipropylenetriamine, tripropylenetetramine, dihexamethylenetriamine, methyl-bis-(3-amino-propyl)-amine, ethyl-bis-(3-aminopropyl)-amine, 2-hydroxy-ethyl-bis-(3-aminopropyl)-amine or mixtures thereof.

Diamines (II) which may be mentioned are: ethylenediamine, N-(2-hydroxyethyl)-ethylenediamine, N,N'-dimethylethylenediamine, 1,2-diaminopropane, 1,3-diaminopropane, N-methyl-1,3-diaminopropane, N,N'-dimethyl-1,3-diaminopropane, N,N-dimethyl-1,3-diaminopropane or mixtures thereof.

Examples of polyamines (A.2)($\alpha$) are given for the polyamines (I) and (II).

The following are preferred: ethylenediamine, diethylenetriamine, triethylenetetramine, tetraethylenepentamine, pentaethylenehexamine, hexaethyleneheptamine, dipropylenetriamine, methyl-bis-(3-aminopropyl)-amine and mixtures thereof.

Preferred dicarboxylic acids (A.2)($\beta$) are: oxalic acid, succinic acid, malonic acid, glutaric acid, adipic acid, sebacic acid, 1,2-dodecanedioic acid, itaconic acid and isophthalic acid.

A preferred example of B is epichlorohydrin.

In accordance with the process according to the invention, clear, preferably aqueous cationic solutions which are stable to storage for months, preferably 6 to 9 months, even at a high solids content of up to 30% by weight, are obtained under conditions which are easy to handle industrially.

The polymers according to the invention are used as paper auxiliaries, above all for imparting wet strength to paper or paper-like materials, such as paper-board or card. The paper is treated here in a manner which is known per se. Preferably, the polymeric compounds are added to the aqueous suspension of the pulp of paper raw material. This is then processed to paper.

In this procedure, 0.5 to 4.0% by weight (based on the paper fibre) of the polymers prepared according to the invention with an active compound content of 10 to 20% by weight, preferably as an aqueous solution, is employed, depending on the desired effect.

In the case of particularly high wet strength requirements, such as, for example, in the case of laminated paper with a high ash content and low weight per unit area, amounts of additive of 6% by weight or more may be necessary to achieve the desired imparting of wet strength.

The polymers prepared according to the invention differ from known polyamine-epihalogenohydrin reaction products in respect of their content of organically bonded halogen and the AOX value (=adsorbable inorganic halogen). In contrast to the high contents of halogenohydrin reactive groups which are otherwise customary—also in the case of acidification with halogen-free acids or in the case of products which are stable in the neutral range—the polymers prepared according to the invention have a considerably lower content of these reactive groups. The organic halogen content and the AOX value of the reaction products are in this way decreased by 50 to 95%, preferably 0 to 90%, in comparison with the known polyamine-epihalogenohydrin products.

The term molecular weight used in context with the invention means weight average molecular weight.

EXAMPLE 1

97.5 g of epichlorohydrin are added dropwise to an initial mixture of 395 g of a 50% strength aqueous solution of a polyamidoamine of U.S. Pat. No. 3,640,840, Column 4, lines 35 to 51, 0.2 g of methyl-bis-(3-amino-propyl)-amine and 750 ml of water at 30° C. in the course of 30 minutes, while stirring, and the mixture is subsequently stirred at 35° C. for 30 minutes.

The mixture is then heated up to 55° C., and after a stirring time of 80 minutes, 750 ml of water are added at a viscosity of about 45 mPas. The mixture is simultaneously cooled to 35° C. and brought to pH 10 by means of a 45% strength NaOH solution and stirring is continued at a constant pH for 30 minutes. Thereafter, a further 310 ml of water are added and stirring is continued at pH 10 for 30 minutes.

The mixture is now acidified to pH 2.0 by means of methanesulphonic acids and the solids content is adjusted by dilution with water.

Solids content: 15.0% by weight
Viscosity: 82 mPas (25° C.)
Organic Cl content: 0.39%.

EXAMPLE 2

395 g of a 50% strength aqueous solution of a polyamidoamine of U.S. Pat. No. 3,640,840, lines 35 to 51 and 750 ml of water are initially introduced into a vessel and 97.5 g of epichlorohydrin are added dropwise at 30° C. in the course of 30 minutes.

After a subsequent stirring time of 30 minutes, the mixture is heated to 55° C., diluted with 750 ml of water after a further 100 minutes and cooled to 35° C. pH 10 is now established by means of NaOH solution and stirring is continued until the desired viscosity is reached.

The mixture is now acidified to pH 2.3 by addition of a benzenesulphonic acid solution and the solids content is adjusted.

Viscosity: 77 mPas (25° C.)
Solids content: 15.0% by weight
Organic Cl content: 0.41%.

EXAMPLE 3

58.5 g of epichlorohydrin are added dropwise to an initial mixture of 240 g of a 50% strength aqueous solution of a polyamidoamine of U.S. Pat. No. 3,640,840, column 4, lines 35 to 51 and 450 ml of water at 30° C. in the course of 30 minutes and the mixture is subsequently stirred at 35° C. for 30 minutes.

It is then heated to 60° C. and diluted with 450 ml of water as the viscosity increases. The mixture is cooled to 40° C. and brought to pH 10 by means of 45% strength NaOH solution and stirring is continued until the desired viscosity is reached.

The mixture is now acidified to pH 2 by addition of a p-toluenesulphonic acid solution and the solids content is adjusted accordingly.

Viscosity: 52 mPas (25° C.)
Solids content: 15.0% by weight
Organic Cl content: 0.51%.

EXAMPLE 4

(a) 292 g of adipic acid are added to an initial amount of 216 g of diethylenetriamine at room temperature; during this procedure, the mixture heats up to 125° C. It is then heated to an internal temperature of 150° C., while stirring, stirred under reflux for 10 minutes and then changed over to removal of the distillate.

The mixture is heated up to 197° C. in the course of 2 hours, the water of reaction distilling off uniformly, and cooled to 160° C. and 430 ml of water are then slowly added to the melt. The mixture is subsequently stirred at 80° to 90° C. for 1 hour and cooled.

Viscosity: 257 mPas (25° C.)
Solids content: 50.5% by weight
Base equivalent weight: 342

(b) 171 g of a precursor according to Example 4 (a) and 315 ml of water are initially introduced into a vessel and 55.5 g of epichlorohydrin are added dropwise at 30° C. The mixture is then heated slowly to 55° C. and diluted with 215 ml of water as the viscosity increases. It is cooled to 40° C. and brought to pH 10 by means of 10% strength LiOH solution, and stirring is continued until the desired viscosity is reached.

The pH is now brought to pH 2.5 with methanesulphonic acid and the mixture is diluted by addition of water.

Viscosity: 46 mPas (25° C.)
Solids content: 12.5% by weight
Organic Cl content: 0.39%.

EXAMPLE 5

(a) 438 g of adipic acid and 169.5 g of ε-caprolactam are added to an initial amount of 324 g of diethylenetriamine, while stirring. During this procedure, the temperature rises to about 100° C. The mixture is then heated to 190° C. in the course of 3 hours, the water of reaction distilling off uniformly, and cooled to 150° C., and 800 ml of water are added.

The mixture is subsequently stirred at 80° to 90° C. for a further hour and cooled.

Viscosity: 330 mPas (25° C.)
Solids content: 51.7% by weight
Base equivalent weight: 436.

(b) 174.4 g of a precursor according to Example 5 (a) and 250 ml of water are initially introduced into a vessel and 38.0 g of epichlorohydrin are added dropwise at 30° C.

The mixture is then heated to 70° C. and diluted with 250 ml of a 3% strength aqueous Ba(OH)$_2$ solution as the viscosity increases.

The mixture is cooled to 40° C. and the pH is brought to pH 11 with the aid of an NaOH solution. After a further 20 minutes, the mixture is diluted again with 150 ml of water and stirring is continued until the desired viscosity is reached.

The pH is now brought to pH 2.0 by acidification with methanesulphonic acid and the mixture is diluted by addition of water.

Viscosity: 41 mPas (25° C.)
Solids content: 15.0% by weight
Organic Cl content: 0.41%.

EXAMPLE 6

(a) 315.4 g of isophthalic acid and 292 g of adipic acid are added to an initial amount of 412 g of diethylenetriamine, whereupon the temperature rises to 125° C.

The mixture is then heated to 195° C. in the course of 2½ hours; the water of reaction is distilled off continuously during this procedure. The mixture is now cooled to 150° C. and 830 ml of water are then added. Finally, the mixture is subsequently stirred at 90° C. for a further hour.

Viscosity: 62 mPas (25° C.)
Solids content: 51.6% by weight
Base equivalent weight: 357.

(b) 46.3 g of epichlorohydrin are added dropwise to an initial mixture of 168.5 g of a precursor according to Example 6 (a) and 100 ml of water/70 ml of ethyl acetate at 30° C. in the course of 15 minutes and the mixture is subsequently stirred for 30 minutes.

The reaction mixture is then heated to 70° C., while stirring, and diluted continuously with 400 ml of water as the viscosity increases.

The mixture is cooled rapidly to 40° C., the pH is brought to pH 10 by means of a 45% strength NaOH solution and stirring is continued at this temperature under a constant pH until the desired viscosity is reached.

The reaction is stopped by acidification to pH 2.0 with a toluenesulphonic acid solution and dilution with ethyl acetate.

Viscosity: 62 mPas (25° C.)
Solids content: 15.0% by weight
Organic Cl content: 0.44%.

EXAMPLE 7

(a) 113 g of diethylenetriamine and 60 g of ethylenediamine are initially introduced into a vessel and 292 g of adipic acid are added; during this procedure, the internal temperature rises to 135° C. The mixture is then heated under reflux at 140° to 150° C. for 30 minutes and then heated to 193° C. in the course of 3 hours, the distillate being removed. The mixture is now cooled to 160° C. and 390 ml of water are carefully added. The initially partly insoluble product now slowly dissolves and is subsequently stirred at 95° C. for a further hour.

Viscosity: 395 mPas (25° C.)
Solids content: 48.9% by weight
Base equivalent weight: 531.

(b) 57.0 g of epichlorohydrin are added dropwise to an initial mixture of 335 g of a precursor according to Example 7 (a) and 568 ml of water at 25° to 30° C. in the course of 30 minutes and the mixture is subsequently stirred for 30 minutes. Thereafter, the reaction mixture is heated to 75° C., while stirring, and diluted with 631 ml of water as the viscosity increases. It is simultaneously cooled to 50° C. and brought to pH 10 by means of a 45% strength NaOH solution. Stirring is then continued under a constant pH until the desired viscosity is reached and the mixture is then brought to pH 2.0 with a methanesulphonic acid solution and adjusted to the desired solids content by dilution with water.

Viscosity: 60 mPas (25° C.)
Solids content: 15.0% by weight
Organic Cl content: 0.17%.

USE EXAMPLE

Bleached pine sulphite pulp is beaten at a consistency of 2.5% in a Holländer to a Schopper-Riegler freeness of 38°. 100 g of the pulp are introduced into a glass beaker and diluted with water to 1, L.

2 or 4% by weight of the product according to the invention (15.0% by weight of solids), based on the fibre, are introduced into the glass beaker. After a stirring time of 3 minutes, sheets of paper with a weight per unit area of about 80 g/m² are formed on a sheet-forming machine (Rapid-Köthen apparatus) using the contents of the glass beakers. The sheets of paper are dried at 90° C. for 6 minutes under a vacuum at a pressure of 20 mm/Hg and are after-heated at 110° C. in a drying cabinet for a further 15 minutes.

After conditioning, 5 test strips 1.5 cm wide are cut out of each sheet of paper and dipped into distilled water for 5 minutes. The wet strips are then clamped in a tensile testing machine and the wet breaking loads are determined.

The results obtained are shown in the following table.

| Examples | Wet breaking load (Newton) Amount used | |
| --- | --- | --- |
|  | 2% | 4% |
| 1 | 10.3 | 14.5 |
| 2 | 10.1 | 14.2 |
| 3 | 9.9 | 13.1 |
| 4 b | 10.4 | 15.0 |

We claim:

1. Water soluble crosslinkable polymeric compounds which are obtainable by reaction of reaction products, containing halogenohydrin groups, of ammonia or mono- or polyamines and an epihalogenohydrin with inorganic bases and subsequent reaction of the resulting compounds containing epoxide groups with halogen-free sulphonic acids to give compounds containing sulphonic acid ester groups.

2. Polymeric compounds according to claim 1, which are obtainable by reaction of
   (A) a water-soluble aliphatic polyamine with primary and/or secondary and if appropriate tertiary amino, carboxamide or hydroxyl groups or mixtures thereof with
   (B) an epihalogenohydrin and if appropriate subsequent simultaneous reaction with further polyamine A in a molar ratio of 0.8 to 3.75 mol of epihalogenohydrin per mol of basic nitrogen in component A and
   (C) reaction with an inorganic base in a molar ratio of 0.2 to 2.0 mol of base per mol of halogenohydrin group
   and (D) reaction with 0.3 to 10 mol of a sulphonic acid, per mol of basic nitrogen in component A, the sulphonic acid being added in at least an amount to achieve a pH of less than 5.

3. Polymeric compounds according to claim 1, which are obtainable by reaction of
   (A.1) a water-soluble amine of the formulae

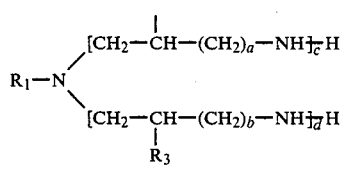

or $$H-\underset{R_4}{N}-CH_2-\underset{R_5}{CH}-(CH_2)_e-\underset{R_6}{N}-H \qquad II$$

in which
$R_1$, $R_4$ and $R_6$ independently of one another stand for hydrogen or a $C_1$–$C_4$-alkyl radical,
$R_2$, $R_3$ and $R_5$ independently of one another stand for hydrogen, methyl or ethyl,
a, b and e independently of one another stand for an integer from 0 to 4 and
c and d independently of one another stand for an integer from 1 to 6,
and/or
(2) a water-soluble polyamidoamine having a molecular weight of at least 800 and prepared from
   (α) an amine of the formula (I) or a mixture of (I) with up to 50 mol % of an amine of the formula (II) and
   (β) aliphatic or aromatic dicarboxylic acids having 2 to 12 C atoms or functional derivatives thereof, such as anhydrides, esters or half-esters, and/or
   (γ) aminocarboxylic acids containing 3 to 6 C atoms, or lactams thereof, with
B. an epihalogenohydrin, and if appropriate simultaneous or subsequent reaction with another polyamine of the formulae (I) or (II), in a molar ratio of 0.8 to 3.75 mol, preferably 0.9 to 3.0 mol, of component B per mol of basic nitrogen of component A, and
C. reaction with an inorganic base in a molar ratio of 0.2 to 2.0 mol, preferably 0.3 to 1.5 mol, of base per mol of halogenohydrin group, and
D. reaction with 0.3 to 10 mol of a sulphonic acid per mol of basic nitrogen of component A, the sulphonic acid being added in at least an amount to achieve acid pH values of less than 5.

4. Polymeric compounds according to claim 1, 5 to 30% strength aqueous or aqueous-organic solutions of which have a viscosity of 15 to 300 mPas at 25° C.

5. Polymeric compounds according to claim 1, for the preparation of which LiOH, NaOH, KOH, Sr(OH)₂, Ba(OH)₂, NH₃, Na₂CO₃ and/or Na₃PO₄ are used as inorganic bases.

6. Polymeric compounds according to claim 1, for the preparation of which sulphonic acids of the general formula $$Z-SO_3H$$

wherein
Z stands for $C_1$–$C_9$-alkyl, $C_2$–$C_9$-hydroxyalkyl, cyclohexyl, phenyl or benzyl which is optionally substituted by $C_1$–$C_4$-alkyl, $C_1$–$C_5$-alkoxy, hydroxyl or a sulphonic acid group. are used.

7. Polymeric compounds according to claim 1 having a molecular weight of 2,000 to 100,000.

8. Process for the preparation of water-soluble crosslinkable compounds, characterized in that reaction products, containing halogenohydrin groups, of ammonia or mono- or polyamines and an epihalogenohydrin are reacted with inorganic bases and the resulting compounds containing epoxide groups are then reacted with halogen-free sulphonic acids.

9. Process for the treatment of paper pulp, characterized in that water-soluble crosslinkable polymeric compounds according to claim 1 are used.

10. Agents for imparting wet strength to paper, characterized in that they contain water-soluble crosslinkable polymeric compounds of claim 1.

* * * * *

UNITED STATES PATENT AND TRADEMARK OFFICE
CERTIFICATE OF CORRECTION

PATENT NO. : 4,929,309

DATED : May 29, 1990

INVENTOR(S) : Bachem et al.

It is certified that error appears in the above-identified patent and that said Letters Patent is hereby corrected as shown below:

Col. 9, claim 3 line 61  Formula I delete " $-\overset{|}{C}H-$ " and substitute -- $-\overset{R_2}{\underset{|}{C}}H-$ --

Col. 10, claim 5 line 42  Delete " $Na_2CO_{O3}$ " and substitute -- $Na_2CO_3$ --

Signed and Sealed this

Eighteenth Day of February, 1992

*Attest:*

HARRY F. MANBECK, JR.

*Attesting Officer*  Commissioner of Patents and Trademarks